Mar. 3, 1925.　　　　　　　　　　　　　　　　　　1,528,049
E. J. FLETSCHER
CHAIR
Filed Feb. 3, 1923

INVENTOR
Eelke J. Fletscher
John A. Naismith
BY
ATTORNEY

Patented Mar. 3, 1925.

1,528,049

UNITED STATES PATENT OFFICE.

EELKE J. FLETSCHER, OF SAN JOSE, CALIFORNIA.

CHAIR.

Application filed February 3, 1923. Serial No. 616,861.

*To all whom it may concern:*

Be it known that I, EELKE J. FLETSCHER, a citizen of the United States, and resident of San Jose, in the county of Santa Clara and State of California, have invented certain new and useful Improvements in Chairs, of which the following is a specification.

It is the object of my invention to provide a chair structure for children so arranged as to embody certain educational features whereby its usefulness will be greatly enhanced.

It is another object of my invention to provide a child's chair equipped with movable elements whereby a limited number of computations may be made by a child by various groupings of the said movable elements.

It is a particular object of my invention to provide a child's chair equipped with movable elements in its back and certain indicia on its frame whereby computations indicated by the indicia may be illustrated by the relative positions of the movable parts.

In the drawing;—

Figure 1:
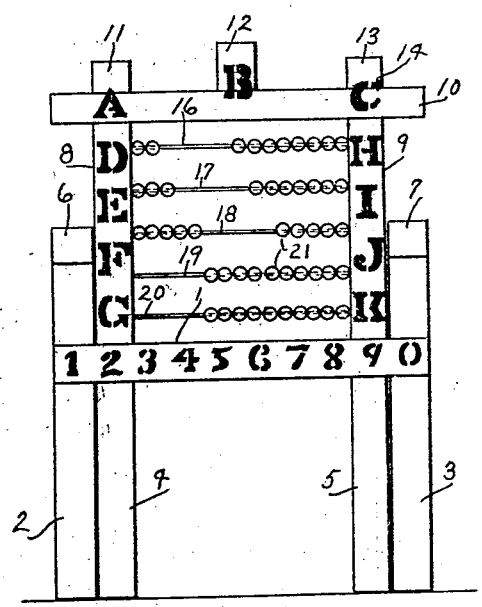
Figure 1 is a front elevation of a chair embodying my invention.
Figure 2:
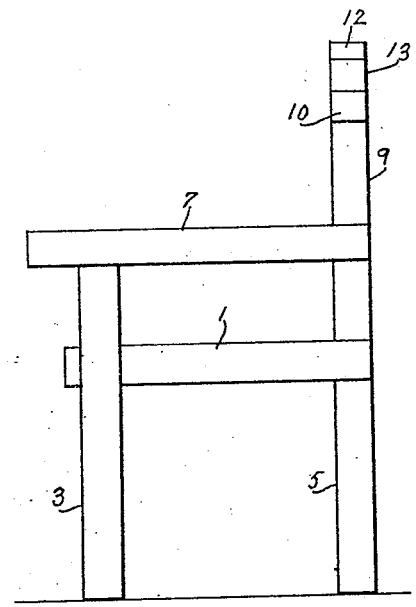
Figure 2 is a side elevation of the same.
Figure 3:
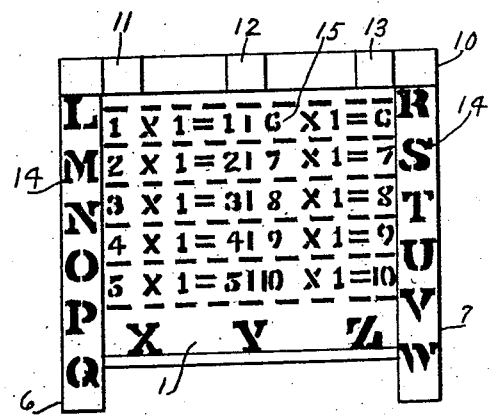
Figure 3 is a plan view of the same.

Referring more particularly to the drawing, 1 indicates the seat, 2—3—4 and 5 the four legs, 6 and 7 the arms, and 8—9 and 10 the two uprights and the cross-piece forming the back of the child's chair.

In the particular embodiment herein disclosed, three blocks as 11—12 and 13 are arranged on cross-piece 10, and the letters of the alphabet are stenciled on the back parts 8—9—10 and 12, the arms 6—7, and the seat 1 as shown at 14. On the seat is also stenciled or otherwise delineated, any suitable arithmetical formulas, in the present case a simple multiplication table being shown at 15.

At 16—17—18—19 and 20 are indicated five rods set in the members 8 and 9, in parallel relation to each other and forming the back of the chair in conjunction with the said parts 8—9 and 10. On each of these rods 16—17—18—19—20 are mounted ten balls in such a manner as to slide freely thereon.

In use a child has the letters of the alphabet in view, which fact assists materially in its memorizing thereof. The sliding balls, which are preferably of many colors, attract a child's attention, and their handy position induces a child to play with them. A child of sufficient years soon learns to solve simple problems in arithmetic by variously grouping the balls, and this tendency is encouraged by providing a suitable table on the seat portion. A child will naturally learn to indicate by means of the balls the several operations indicated by the printed table, thereby encouraging the study of mathematical computation, other tables than the one on the chair being used as the child advances in learning.

It may be seen from the foregoing that I have provided a device that combines in one structure a chair, and certain educational features cooperating therewith to induce a child to study while resting.

It is to be understood, of course, that while I have herein shown and described one specific embodiment of my invention, changes in form, proportions, construction and method of operation may be made within the scope of the appended claims.

I claim:

1. An article of manufacture comprising a child's chair having a plurality of movable elements arranged in the back thereof, and indicia indicating a use for said elements arranged on the seat portion thereof.

2. An article of manufacture comprising a child's chair having a plurality of parallelly arranged and spaced rods horizontally mounted in the back thereof, movable elements slidably mounted on said rods and indicia indicating a use for said elements arranged on the seat portion thereof.

3. An article of manufacture comprising a child's chair having an upstanding back thereon, and an abacus mounted within the framework of said back.

4. An article of manufacture comprising a child's chair having a plurality of movable elements arranged in the back thereof, and indicia indicating a use for said elements arranged on the framework of said chair.

EELKE J. FLETSCHER.